May 23, 1961  R. E. READ  2,985,355
BAGS AND METHOD OF MAKING BAGS
Filed Dec. 3, 1952  7 Sheets-Sheet 1

INVENTOR.
ROBERT E. READ
BY
ATTORNEY

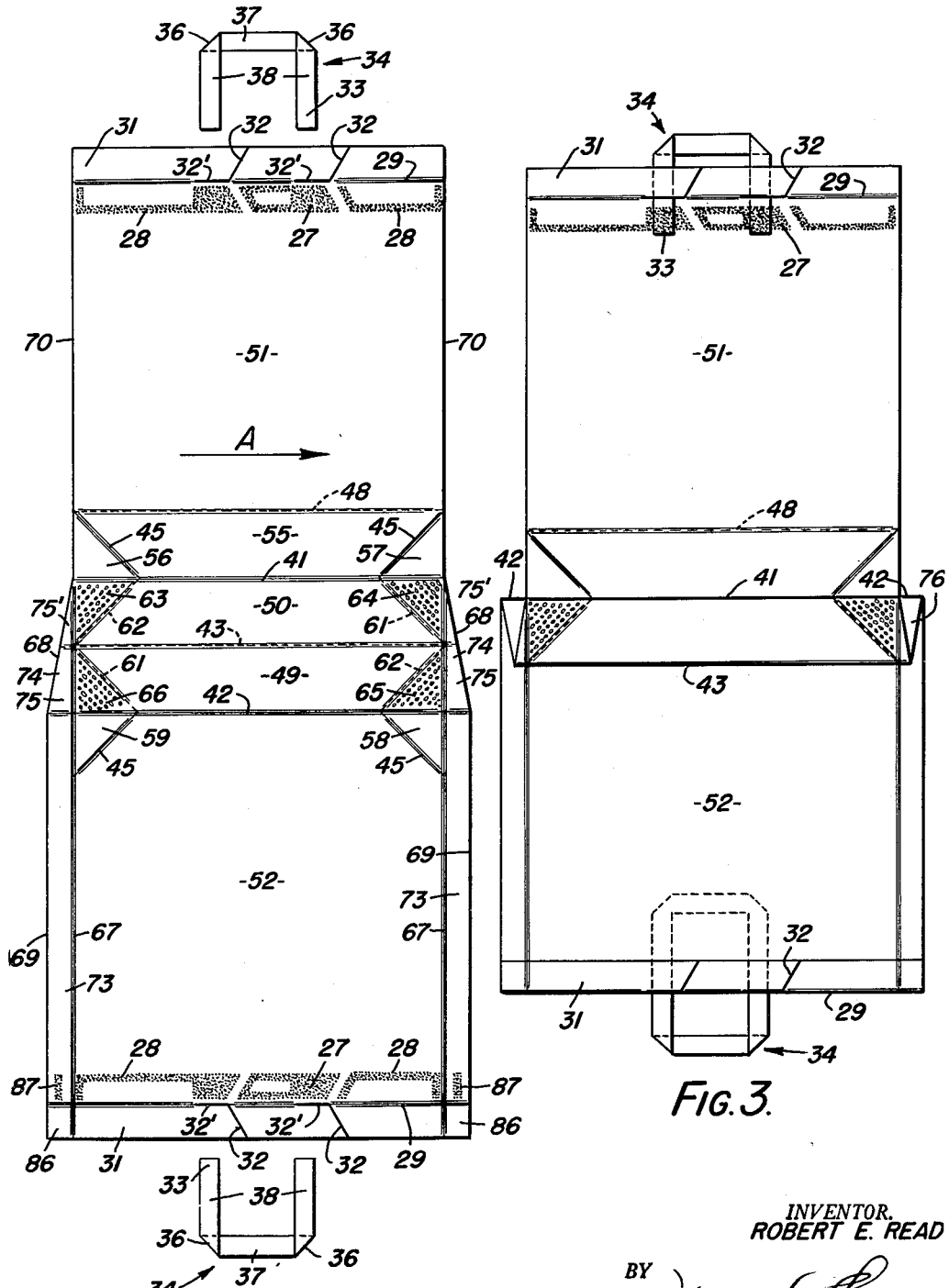

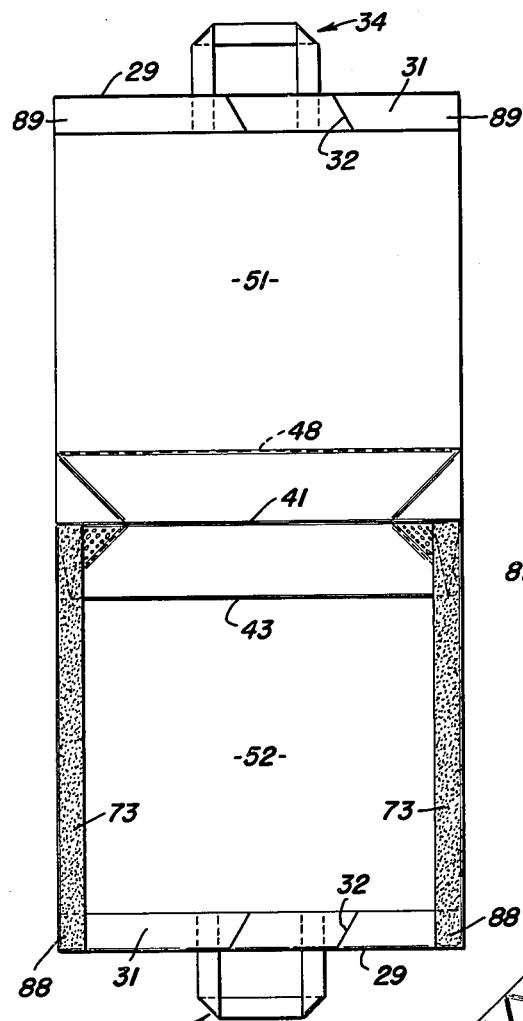
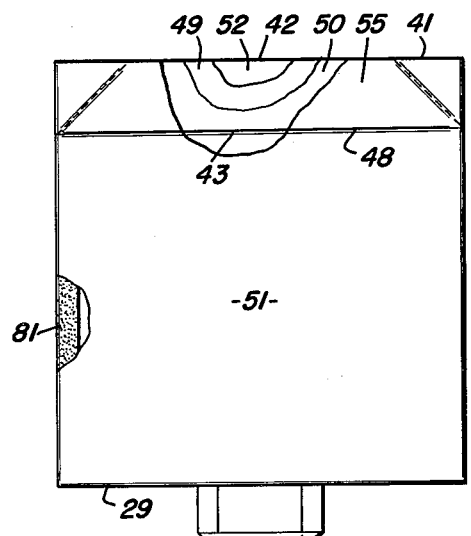
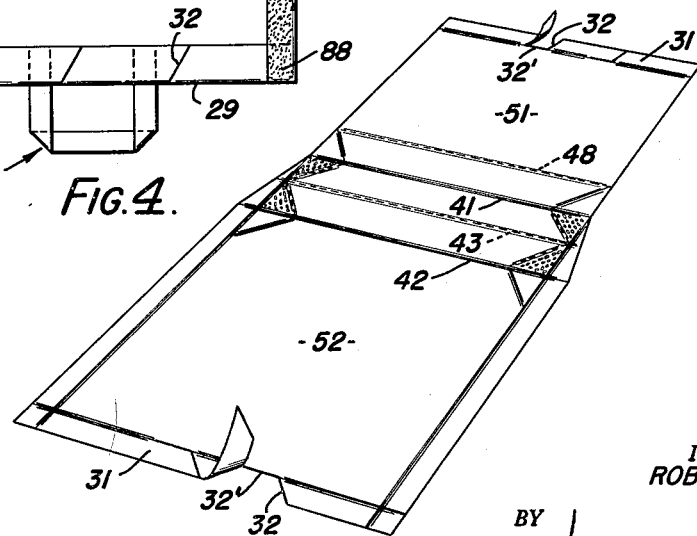

INVENTOR.
ROBERT E. READ
BY
ATTORNEY

May 23, 1961  R. E. READ  2,985,355
BAGS AND METHOD OF MAKING BAGS
Filed Dec. 3, 1952  7 Sheets-Sheet 5

INVENTOR.
ROBERT E. READ
BY
ATTORNEY

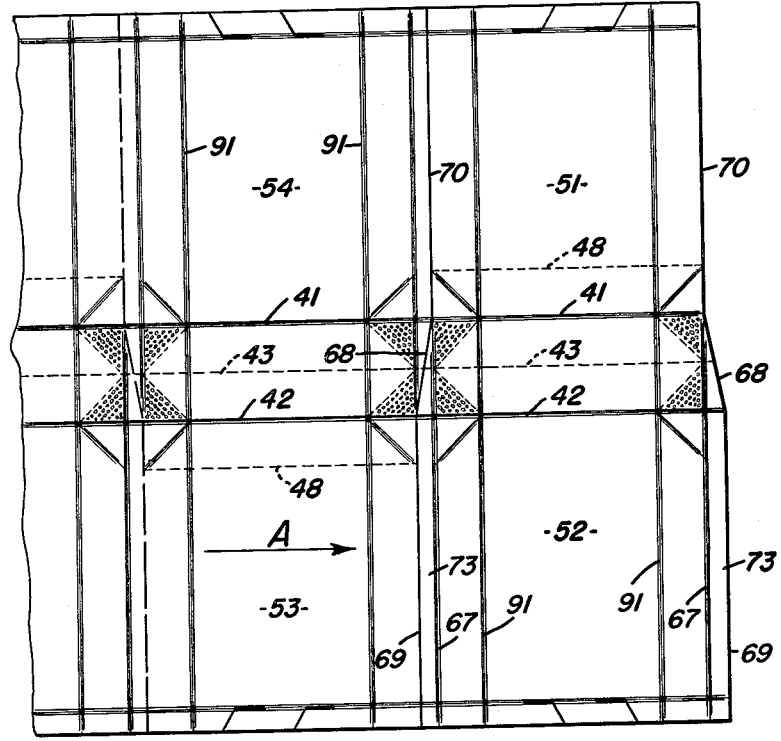
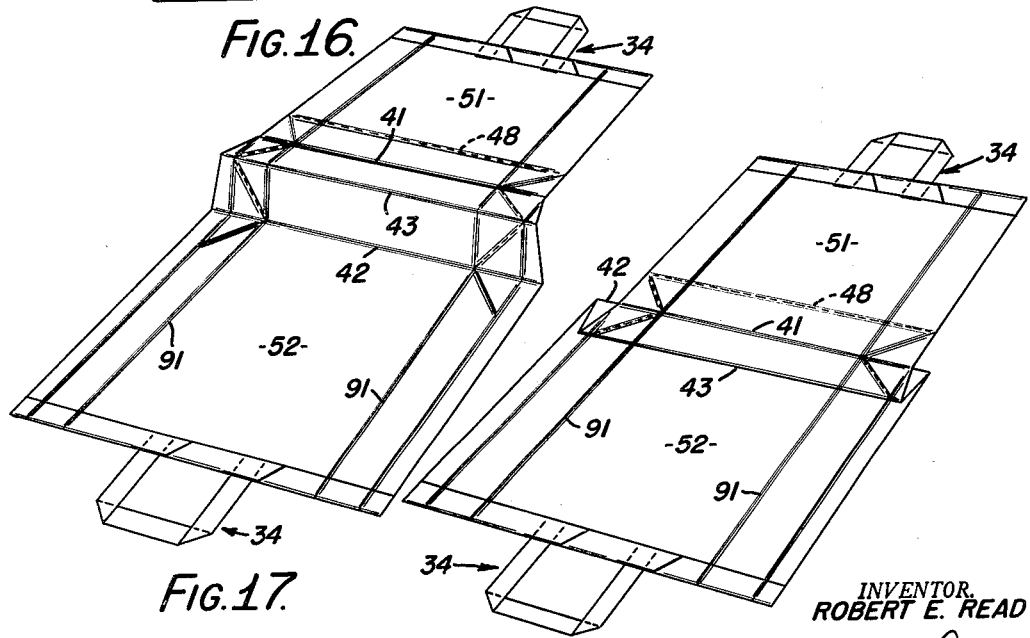
FIG.16.
FIG.17.
FIG.18.
INVENTOR.
ROBERT E. READ
BY
ATTORNEY May 23, 1961    R. E. READ    2,985,355
BAGS AND METHOD OF MAKING BAGS
Filed Dec. 3, 1952    7 Sheets-Sheet 7

INVENTOR.
ROBERT E. READ
BY
ATTORNEY

United States Patent Office 2,985,355
Patented May 23, 1961

2,985,355

BAGS AND METHOD OF MAKING BAGS

Robert E. Read, R.F.D. 1, Glens Falls, N.Y.

Filed Dec. 3, 1952, Ser. No. 323,793

16 Claims. (Cl. 229—60)

My invention relates to paper bags and a method of making paper bags. The invention as shown herein is embodied in a so-called shopping bag but as will be apparent, the general principles of my invention may be embodied in general purpose bags and the invention includes a method of making such general purpose bags. The method of making paper bags, as described herein, however, is particularly adapted to making shopping bags and bags whose bottoms are completely seamless and sift proof and whose side seams are positively sealed against sifting.

The principles of my invention may also be embodied in fluid tight hermetically sealed bags or bag liners which may be heat sealed such as those made of chlorinated rubber compounds, cellophane or their equivalent.

The conventional commercial bags, whether of the flat type, square type, diamond fold or satchel bottom type, or automatic type are commercially made by the same general method. They are conventionally made in machines in which a web of paper from a stock roll is passed between various machine rolls including scoring, cutting and gluing rolls and tubed in a direction longitudinally of the web of paper, i.e. longitudinally of the direction to which the web of paper travels as it passes through the machine. Such bags have a single side seam either centrally located or offset, said seam being formed by the side edges of the web. The bottom which is at one open end of the tube, is formed after a tubed blank has been severed from the web, by scoring and folding operations not necessary to specifically detail herein.

Bags commercially made by the above method are inherently faulty in that they will allow materials such as sugar, salt, flour and other pulverulent materials to sift through the bottom. The bottom cannot be fully closed and sealed on a commercial production basis. This is inherent in diamond folded or satchel bottom bags and true as to flat and square bags as a practical matter due to the difficulty encountered in securing tight bottom seals.

In making so-called shopping bags by the general above described methods, a further and very distinct problem is encountered. To secure proper anchorage of the handles, it is necessary, in the most widely commercially employed type of shopping bag, to adhesively apply a patch on the inside of the bag mouth which overlies and anchors the handle ends. While machinery has been developed for applying the handles and patches, such machinery is expensive, complicated and relatively slow. However, more important is the fact that the sharp cutting edge still remains at the mouth of the bag which is a hazard to the user. Moreover, the bag mouth is more subject to tearing than a bag made by the method of my invention as will presently appear. In addition, the inherent faults of bags tubed and bottomed in the manner above described still exist in the shopping bag made as above set forth.

While the conventional method of tubing and bottoming as described above results in a bag bottom through which materials may sift, various types of bags have been made with a sift-proof bottom. In some of the machines for making bags of this type, such as that shown in Haskell Patent No. 2,014,497 issued September 17, 1935, or Potdevin Patent No. 2,054,833 issued September 22, 1936, fold lines are formed extending longitudinally of the web which provide flaps at the two sides of the bag. The advancing web of paper is cut into the proper length for a bag blank and then the bag blank length is folded on a transverse line, that is, transverse to the direction in which the paper is moving, approximately midway between its ends to form a bag. Machines for making bags in this manner are relatively slow and, in connection with shopping bags, the same difficulty would be encountered in attaching and anchoring the handles to the bag blanks as set forth above. Moreover, the bags with which I am familiar made by this method are usually of the square or flat type. A bag made longitudinally of the machine and tubed by a folding operation on a line transversely of the machine results in one or more of the following objectionable features: there is a duplication of paper at the seams; a peeling seam is formed; or cutouts may be required in the bag blank. These cutouts not only result in wastage of paper but more important, the cutouts must be disposed of and if not adequately disposed of, frequently jam the machine.

An object of my invention is to provide a method of making a bag in which a planar web of paper is cut into bag blanks in a direction at right angles to the direction in which the web of paper advances as it passes through the machine, to avoid duplication of paper at the seams, peeling seams, and cutouts and provide a bag which is siftless.

Another object of my invention is to provide a method of making bags and a bag structure wherein the web of paper is scored adjacent and along its longitudinal center to form the bottom of the bag; the web is scored and cut transversely of the direction in which it advances to form the sides; and the portions adjacent the side edges of the web form the open end or mouth of the bag.

Another object of my invention is to provide a method of making bags and a bag blank wherein the web of paper is scored and cut transversely of the direction in which it advances to form the sides; and the front and rear faces together with the bottom are a continuous sheet extending transversely of the direction in which the web advances; and the scoring and cutting to form the sides of any two adjacent bags is performed in a manner such that the blanks of two adjacent bags are complementary whereby wastage of paper is avoided and no cutouts or stripping of cutouts is required.

Another object of my invention is to provide a method of making a bag in which the web of paper is cut into bag blanks in a direction at right angles to the direction in which the web of paper advances whereby in making a shopping bag, the handles thereof may be easily applied to the side edges of the web prior to the severing of the web into bag blanks and the handles properly positioned and anchored adjacent what will be the mouth of the bag when completed without the use of patches.

Still another object of my invention is to provide a shopping bag construction in which the handles thereof are anchored by adhesive between the handle ends and the inner part of the bag proper and by adhesive between the other sides of the handle ends and a downwardly and inwardly turned strip extending completely around the mouth of the bag, the down-turned strip being integral with the bag proper to the end that the handles are securely anchored adjacent the mouth of the bag and a cutting edge at the rim or lip of the bag mouth is avoided.

My invention further contemplates a bag structure which may have a square or diamond fold bottom and may be of the automatic or non-automatic type, the bag having certain characteristics: the front and rear faces or sides, together with the bottom, are a continuous sheet so that the bottom is sift proof; the long direction of the paper fibres run across the faces of the bag from one side edge to the other instead of longitudinally thereof; the seams lie at the side edges of the bag so that they are inconspicuous; the sides of the blank which merge into the bottom are locked in position; the portions which when folded at the bottom result in a diamond shape or automatic bag, are infolded; and in my method of making a bag the parts which would normally be free to flap or form crevices in the interior of the bag and prevent the complete emptying of the bag are sealed to the interior of the bag adjacent the bottom.

Other objects and advantages of the method of my invention and the bag produced thereby will be set forth in the claims and will be apparent from the following description, when taken in connection with the accompanying drawings, in which:

Fig. 2 is a view of a single bag blank indicating the direction in which the bag blank moves through the machine and showing the areas to which adhesive is applied for the reception of the handles of a shopping bag; indicating the edge strips which are down-turned and adhesively secured to anchor the bag handles; and showing the score lines upon which the bag blank is folded;

Figures 12, 13:
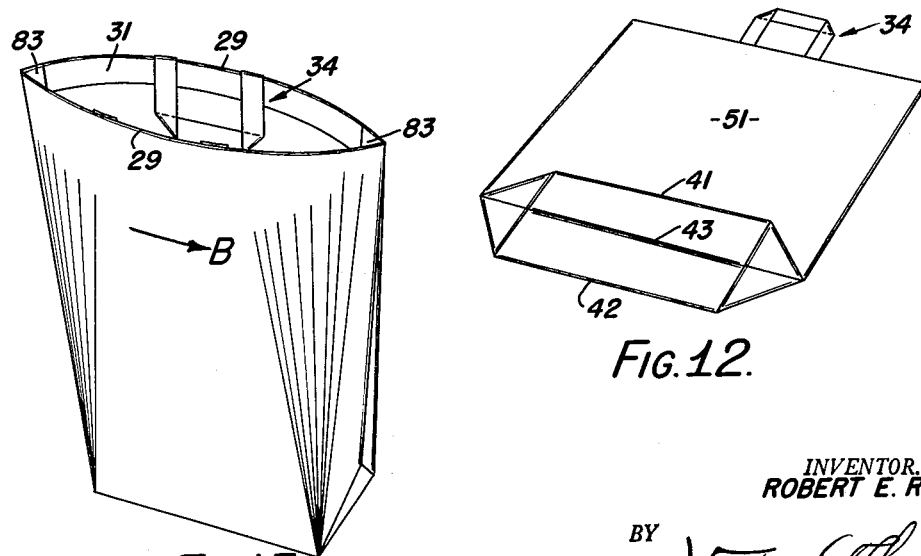
Figures 7, 8:
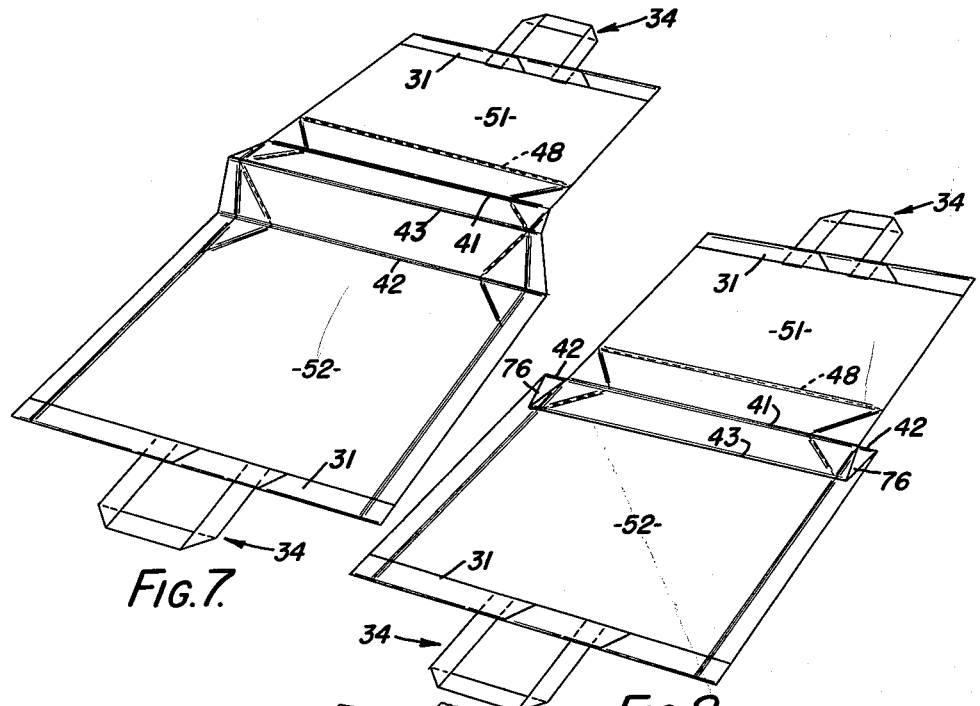
Figures 9, 10:
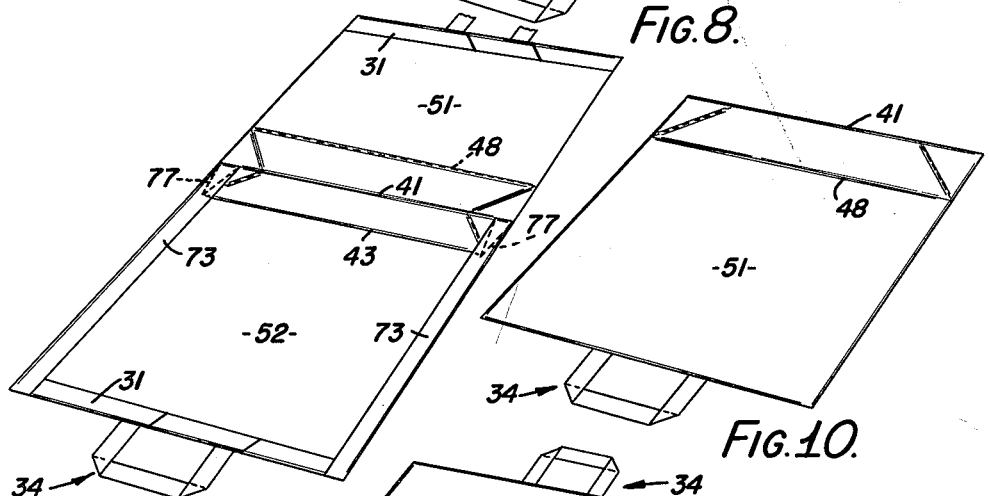
Figure 11:
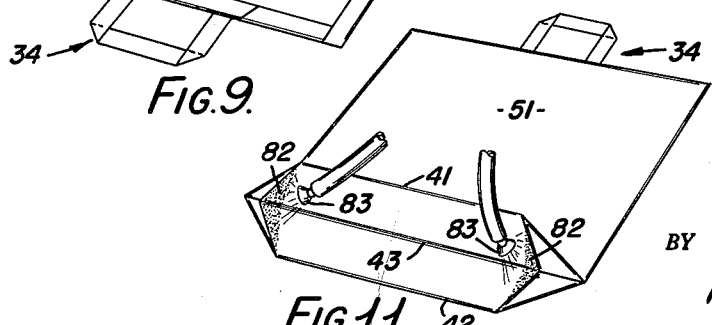
Figure 14:
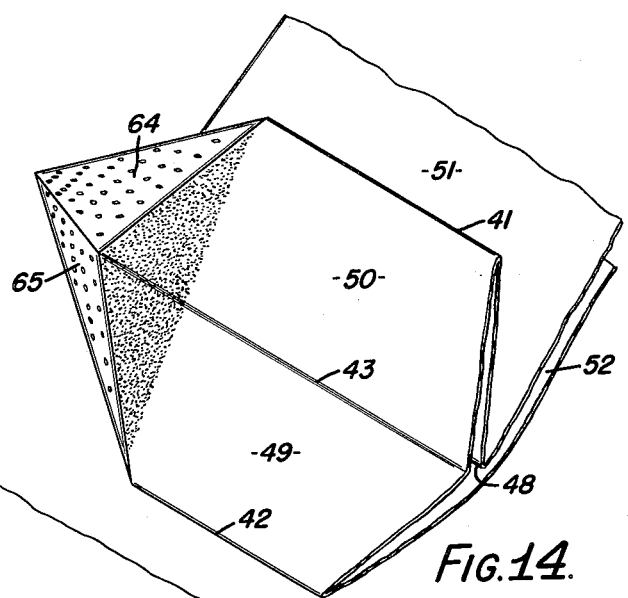
Figure 15:
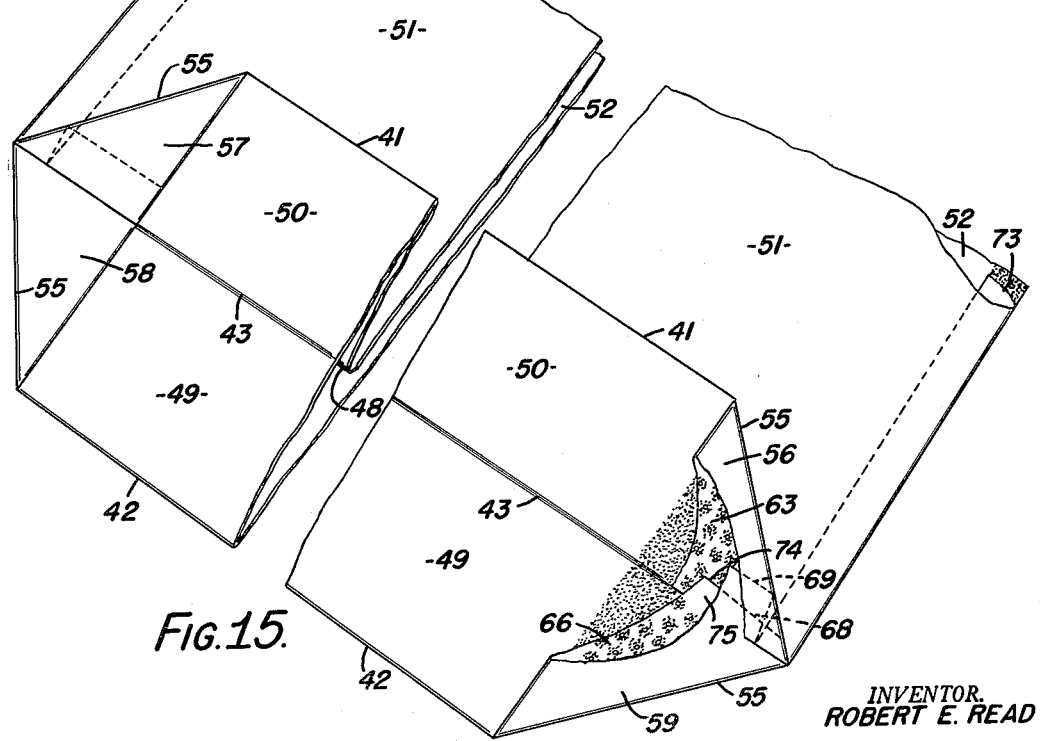
Figures 19, 20:
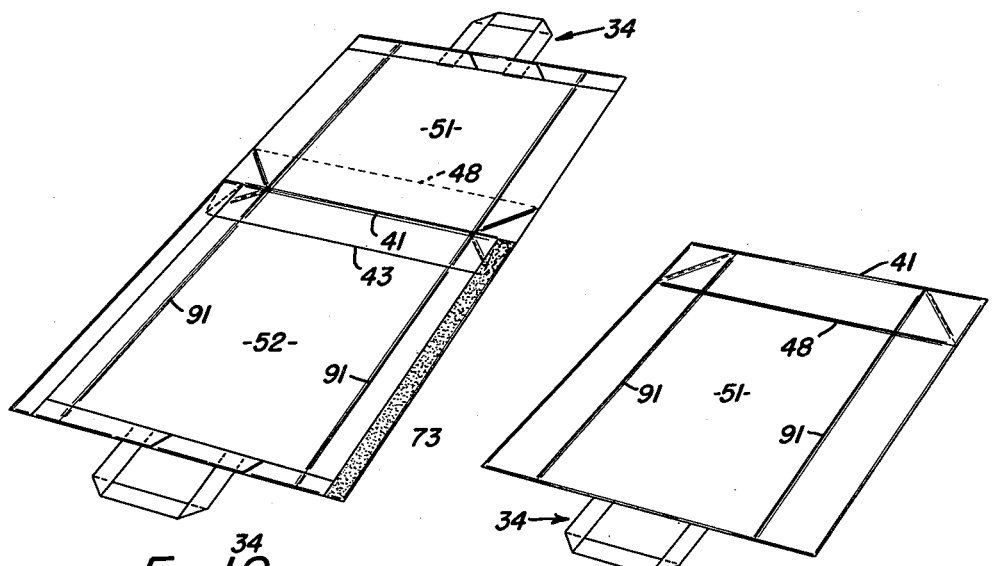
Figures 21, 23:
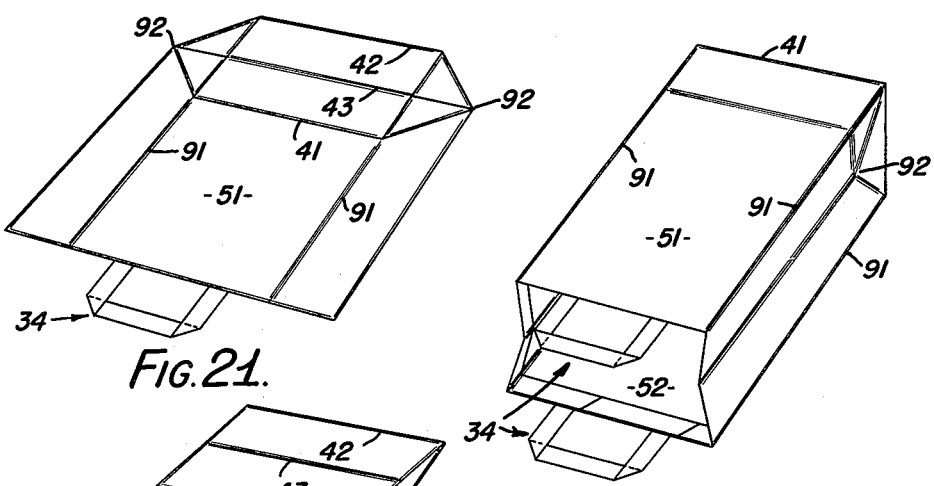
Figure 22:
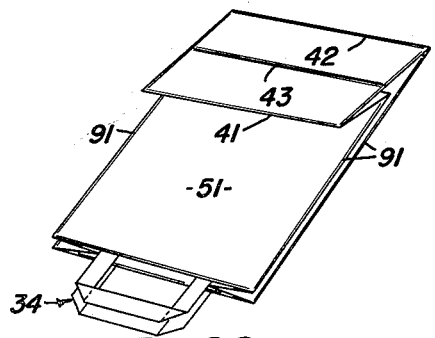

Fig. 3 is a view similar to Fig. 2 showing several additional steps of the method which except for the folding of the bag bottom, are preferably performed when the material is in web form, namely, at one edge of the blank the handle has been attached but the handle anchoring flap has not been turned down while at the other edge the handle has been completely attached and anchored by the inwardly turned flap, and the next step of the method after the attachment of the handles and severance of a bag blank from the web has also been indicated by a partial folding to form the bag bottom;

Fig. 4 is a view similar to Fig. 3 showing the bag handles attached to the bag blank, showing the inward turning of the side flaps and indicating the application of adhesive to the side flaps for adhesively securing the bag blank side walls together for the purpose of forming a bag;

Fig. 5 indicates the next step in the method in which one face or side wall has been folded upon the other and the sides adhesively secured together along the lines of adhesive shown in Fig. 4, parts having been broken away to illustrate the invention more clearly;

Fig. 6 is a view of the bag blank in perspective and corresponds approximately to Fig. 2;

Fig. 7 is a perspective view showing how the bottom is folded, the view being in the sequence of folding operations employed in forming the bag bottom just prior to that indicated in Fig. 3;

Fig. 8 is a perspective view corresponding, insofar as the formation of the bag bottom is concerned, to Fig. 3;

Fig. 9 is a perspective view corresponding to Fig. 4 except that although the side flaps have been turned inward, adhesive has not yet been applied to the surfaces of the side flaps which now lie uppermost;

Fig. 10 is a perspective view corresponding to Fig. 5;

Fig. 11 is a perspective view showing a step in the method of forming the diamond or satchel bottom fold at the bottom of the bag and illustrating diagrammatically how adhesive may be shot into the corners of the satchel bottom;

Fig. 12 is a perspective view of a completed bag showing the position which the parts occupy during shipment of the bag or prior to its opening for use;

Fig. 13 is a perspective view showing the bag squared up at the bottom for the reception of materials to be transported;

Fig. 14 is a perspective view of a corner of the bottom and indicating the purpose, in this embodiment of the invention, of perforating portions of the bottom, the view being that of the left hand corner of Fig. 11;

Fig. 15 is a perspective view of the bottom of the bag with parts broken away to better illustrate the locking of the parts and the sealing of the layers together, which is accomplished, in this embodiment, by perforating portions of the bottom;

Fig. 16 is a perspective view of a web of paper which advances through a bag machine continuously in the direction indicated by the arrow, the web having been scored for the purpose of making an automatic bag or one having satchel sides and bottom;

Fig. 17 is a perspective view of a bag blank for an automatic bag indicating the beginning of the first step in the formation of the satchel bottom of the bag, the bag handles having been previously attached and anchored prior to severance of the web as shown in Fig. 16, into separate bag blanks;

Fig. 18 is a view similar to Fig. 17 indicating the completion of the first bottom folding step in the method of making the automatic bag;

Fig. 19 is a perspective view of the automatic bag showing the infolding of the side flaps after the bag bottom has been partially formed, one side flap being shown with adhesive while the other flap is free of adhesive to show locked in parts;

Fig. 20 is a perspective view showing the appearance of the partially formed automatic bag after one face or side wall has been folded over upon the other face or side wall and the side walls have been secured together along the lines of adhesive on the side flaps;

Fig. 21 is a perspective view showing the bottom folded upward and over and the condition of the bag just prior to completion of the folding operations;

Fig. 22 shows a completed automatic bag as it appears when shipped or ready for use; and Fig. 23 is a view of the bag after it has been shaken to open it automatically for the reception of articles to be transported.

A machine for making the bags shown in this application will be shown, described and claimed in a separate application for patent. This application is confined to the method of making a bag and the bag structure produced thereby. It will be understood that while I have shown a shopping bag, the general principles of my invention are applicable to the production of general purpose bags, that is, bags without handles and to the making of bags from materials other than paper and such bags are intended to be included within the claims. Moreover, the invention may also be applied to the making of multi-wall bags.

Figure 1:
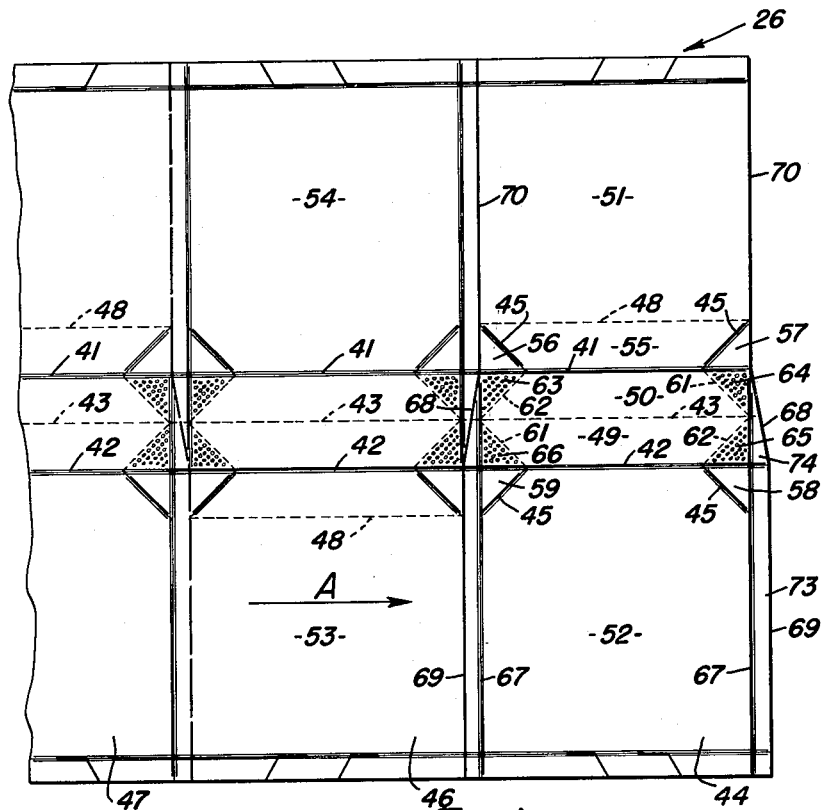
Fig. 1 is a view showing a web of paper which is continuously moved through a bag machine in the direction indicated by the arrow and which is cut and scored as indicated to form successive bag blanks.

Referring now to Fig. 1, the web of paper, generally indicated by the numeral 26, is assumed to be moving through the machine from left to right as indicated by the arrow. The web is drawn from a large roll of paper and continuously moves through the machine.

The first operation to be considered is preferably the application of adhesive along two lines or areas spaced inward from the edges of the web. The lines of adhesive are not shown in Fig. 1 but are shown in Fig. 2. The adhesive is preferably applied when the material is in web condition. The adhesive applying rolls for the application of adhesive along the areas or lines 27 (see Fig. 2) is provided with raised and depressed portions which produce the areas of adhesive, as indicated at 28, and the areas to which no adhesive is applied. The adhesive could be applied continuously along the lines 27 but it is not desirable to apply more adhesive than necessary in the interest of economy and in the interest of avoiding excessive adhesive likely to spread to adjacent parts of the bag to which no adhesive should be applied. It will be understood that the adhesive applying rollers on each side of the machine are preferably the same and that they are of a circumference corresponding to the width of the bag so that the same pattern of glue lines 27 is repeated on successive areas of the advancing web or on successive bag blanks.

Along the longitudinal edges of the web but spaced inward therefrom, score lines 29 scored downward as viewed in Fig. 2, are provided to define edge or handle anchoring flaps 31. These edge flaps 31 are provided with angularly directed cuts 32 which merge with longitudinally extending portions 32'. The angularly extending cuts 32 extend from the edges of the web while the longitudinally extending cuts 32' are coincident with the score lines 29. The cut portions 32, 32' provide flaps or tabs which may be raised, as indicated in Fig. 6, so as to receive the ends 33 of handles 34 beneath them.

The handles may be of any suitable material such as cord or paper but for my purpose I find the most satisfactory handle to be a handle made of crepe paper. Preferably the crepe paper is of double thickness formed by folding over a strip of paper and adhesively securing the folded over parts together. The handle blank is folded as indicated at 36 (Fig. 2) to form a hand receiving part 37 and arms 38 which terminate in the ends 33.

In Fig. 2 I have shown the handle in a relationship with respect to the web of paper in about the position it may occupy just prior to its attachment to the web of Fig. 1. It will be understood that the handles 34 are formed automatically and during at least a portion of the advance of the web they advance with the web. When the handle is applied as shown in Fig. 3, by mechanism incorporated in the machine, the ends 33 are applied to the strip of adhesive 27 which may be accomplished when the tabs formed by the cut portions 32, 32' are raised in the manner indicated in Fig. 6. The handle ends are then inserted beneath the raised tabs formed by the cut portions 32, 32' and their lower sides adhesively secured to the web.

As shown in the upper part of Fig. 3, the handle ends 33 are coated with adhesive either prior to or subsequent to their application to the web. The flaps 31, including the tabs formed by the cut parts 32, 32' are then folded down along the score lines 29 so that the upper edge or mouth of the bag is defined by the score lines 29. It will be particularly noted that the flaps 31 are an integral part of the bag. The flaps 31 are preferably folded down when the material is in the web condition of Fig. 1, although it would be possible to perform this operation after the severance of the web into bag blanks. In Fig. 3 in dotted lines and also in Fig. 13, I have indicated how the handles may be folded inside the bag if desired for shipment or any other purpose.

One of the important aspects of the bag structure of my invention and its method of manufacture is that the score line 29 defining the upper edge or mouth of the bag is a double thickness of paper. That is, when the two halves of the bag are adhesively secured together as will presently appear, the double thickness of paper along the edge 29 extends completely around the mouth of the bag. This double thickness not only strengthens the mouth of the bag but avoids a sharp cutting edge. Moreover, the edge being a folded edge, resists tearing.

As is well known in the art, a single thickness sharp edge of paper can cause cutting of the fingers and hands when reaching into a bag. This hazard is avoided in the bag of my invention. As is further well known in the art, the mouth of a bag is subject to being torn and is one of a bag's weakest points. In the bag of my invention the mouth is strengthened not only by the double thickness of paper but also the long direction of the fibres of the paper runs in the direction of the arrows A of Figs. 1 and 2 which increases the resistance to tearing of the paper in a direction transversely of the fold line 29 or transverse to the long direction of the fibres.

When it is desired to produce a general purpose bag, the handles are omitted, the cut portions 32 are omitted and the flaps 31 turned downward and inward in the manner previously described to provide a reenforced, non-cutting edge for the mouth of the bag. However, in less expensive general purpose bags, if desired, the flaps 31 may be omitted and the edges 29 may constitute the mouth of the bag. This edge defining the mouth of the bag may be provided with a conventional sawtooth to avoid a cutting edge.

Referring now to Fig. 1, as the web of paper passes through the machine, additional longitudinal score lines are formed in the web which, as presently will appear, constitute part of the score lines for forming a satchel or diamond folded bag bottom. These score lines are located along and adjacent the center line of the web and include a downwardly scored line 41 and a downwardly scored line 42. These score lines are continuous longitudinally of the web and are formed by scoring rolls which have a continuous scoring edge. Longitudinally of the web and on the center line thereof is an upwardly scored line 43 which is also continuous. This score line lies on the center of the bottom of the bag when the bag is erected as shown in Fig. 13 and as will presently appear.

As will be apparent from an examination of Fig. 1, as the web of paper is advanced through the machine, bag blanks are formed successively. One successive series of these bag blanks has been designated in Fig. 1 by the numerals 44, 46 and 47. It will be noted that bag blanks 44 and 46 are complementary to each other and that the next succeeding bag blank 47 is cut from the web in the identical way that bag blank 44 is cut as will presently more particularly appear.

Considering the bag blanks 44 and 46 in addition to the score lines previously described, upward score lines 48 extending longitudinally of the web are provided. These score lines on successive bag blanks are equidistant from and on opposite sides of the center score line 43.

As previously mentioned the bag blanks 46 and 44 are complementary to each other. The bag blank 44 has side walls 51 and 52 and the bag blank 46 has side walls 53 and 54. The side walls 51 and 53 are duplicates of each other. Similarly the side walls 52 and 54 are duplicates of each other. As divided by the score lines 41, 42, 43 and 48, each bag blank has three approximately rectangular sections 49, 50 and 55 which are modified by diagonal score lines to be described, into equilateral trapezoids. In the specification and claims when considering the web of paper the direction of the arrow A of Fig. 1 will be considered the longitudinal direction. However, when considering the bag blank or the bag including the various stages of forming it, the direction normal to the direction of the arrow A of Fig. 2 will be considered the longitudinal direction since this is the long direction of the bag blank.

The next in the series of scoring operations to be considered, although not necessarily the next scoring operations to be performed, is to provide score lines 45 which are formed in diagonal lines extending at angles of 45° with respect to the score lines 41 and 42. These score lines 45 are scored downwardly and form part of the score lines for enabling the blank to be diamond folded or satchel bottom folded. The score lines 45 may be formed in commercial practice by two rolls, the upper of which has four diagonal scoring knives mounted thereon and the lower of which in practical operation forms the center score line 43 previously described. The score lines 45 together with the score lines 41 and 42 form two sides of triangles 56, 57, 58 and 59.

The next score lines to be considered ar score lines 61 and 62. These score lines are scored upward and are preferably formed in succeeding operations. The score lines 61 and 62 together with the score lines 41 and 42 form two sides of each of triangles 63, 64, 65 and 66. It will be particularly noted that score lines 61 and 62 intersect the score lines 45 on the score lines 41 and 42 for the purpose of providing a diamond folded bottom as will presently appear.

The next operation to be considered is the perforating of the triangles 63, 64, 65 and 66. It may be stated at this point that the purpose of perforating these triangles is to permit adhesive to flow through the perforations, the function of which will later be made clear. In this connection it should be understood that while I have shown the above mentioned triangles perforated, this is not essential as adhesive may be applied directly to the desired areas eliminating certain mechanical difficulties involved in properly performing the perforating operation not necessary to detail herein.

The next score lines to be considered are score lines 67 which are scored down transversely of the web. These score lines extend from one edge of the bag to the score line 41. Part of these score lines form part of the side edges of the bag when the bag is completed.

At this point, it will be noted that all operations on the web have been completed, the handles have been attached and all score lines have been made. The bag blank is cut from the web along a diagonal line 68 and straight lines 69 and 70 which merge with the ends of the diagonal line. The lines 68, 69 and 70 may be perforated lines or long slits with small connections between two adjacent bag blanks so that the bag blank may be pulled away from or separated from the bag blank 46 along the lines 68, 69 and 70. The bag blanks are pulled apart at the proper time during the advance of the web by a pull longitudinally of the web on the bag blank to be severed from the web to be followed by the succeeding folding operations. If long slits are employed they may be cut in the web at any time during its advance. However, if the lines 68, 69 and 70 are complete cuts, they are the last operations performed on the web prior to the start of folding operations. Between the score lines 67 and the cut lines 69, flaps 73 are formed.

It will now be noted that the bag blanks 44 and 46 (Fig. 1) are duplicates of each other but are formed in opposed relation with respect to the center line 43. Moreover, it will be noted that no waste of paper results even by reason of the use of the side flaps 73 and their extensions, triangles 74. No part of the web is cut away. This is important not only in avoiding waste of paper but also in avoiding paper scraps which, if allowed to accumulate by inadequate stripping, are likely to interfere with the operation of the machine.

In Fig. 2 I have shown a completed blank which has been cut from the web on the line 69—68 and 70 prior to the bag forming and folding operation. It will be particularly noted that between the lines 67 and 69 the transverse flaps 73 are provided which merge with the triangular flaps or extensions 74. The function of the latter will appear as the description of the folding operation proceeds. The triangular flaps 74 are divided into two parts 75 and 75' by the fold line 43.

The first step in the series of folding operations is shown in Fig. 3. Prior to the commencement of the folding operation, as previously mentioned, the handles 34 have been attached to the web and the edge or handle anchoring flaps 31 have been folded inward and downward over the handles to lock the handles in position and substantially finish the mouth of the bag. The view of the handles and flap 31 at the top of Fig. 3 is employed for purposes of illustration and does not show the true conditions when the first fold is made. The actual condition at this time is shown in solid lines at the bottom of Fig. 3.

In the conventional commercial machine or method of making bags of the general types with which this invention is concerned, the bag is tubed in a direction longitudinally of the direction in which the web is traveling. In my method of making bags no tubing in the conventional sense occurs since no tube is ever formed. This fact and the following is of the essence of my invention, namely, the bag blanks are formed transversely of the continuously advancing web of paper. Severance of the successive bag blanks is by cuts 68, 69 and 70 transverse to the direction in which the web advances.

These facts lead to a number of important advantages, perhaps the foremost of which is that the bottom of the bag is siftproof and the bottom of the bag is continuous, integral with the side walls and devoid of seams. Perhaps of equal importance insofar as shopping bags are concerned is the fact that the handles are applied to the side edges of the web and are applied as the web is continuously advanced. No patch is required to anchor the handles, the handle anchoring flaps 31 being integral with the web and being turned downward to anchoring position automatically.

A further important fact is that the long direction of the paper fibres extends transversely of the bag blank, as indicated by the arrow B of Fig. 13, resulting in a strengthening of the mouth of the bag, as previously described, and a bag which is stronger against a force tending to bulge the sides of the bag outward. Moreover, in order to change the bag height in the conventional method of tubing a bag, it is necessary to change the speed of the cutting and scoring knives with relation to the speed of advance of the web of paper. By the method of my invention the height of the bag may be varied merely by changing the width of the web. This is of course easily accomplished and still permits the handles to be attached along the side edges of the web by moving the handle forming and attaching mechanism closer to the center line of the machine upon which the bag is made. Further, my method avoids wastage of paper since the successive bag blanks are complementary and stripping of cuttings is avoided.

Other advantages flow from my method of forming the bag blanks which will be set forth as this description proceeds. After the bag blanks have been completed and severed as above described, it is immaterial whether they are folded transversely of the direction of advance or turned through 90° and folded longitudinally of the direction of advance.

In the first folding operation the blank is shifted from the position shown in Fig. 2 to that shown in Fig. 3, the blank being hinged or swung about the score line 42 and the score line 41 superimposed over it. This brings the upwardly scored fold line 43, as viewed in Fig. 3, below the coincident score lines 41 and 42. In Figs. 7 and 8, I have illustrated the first folding operation in two steps by perspective views. It will be particularly noted that when the blank is shifted into the position shown in Fig. 3, the triangles 74 formed by the diagonals 68 and score lines 67 and 42 are divided into the parts 75 and 75' with the part 75' superimposed over the part 75, as illustrated at 76 in Figs. 3 and 8.

The next step in the folding operation is illustrated in Fig. 4 and in perspective in Fig. 9. In this operation, flaps 73 which extend transversely of the web and may be considered to lie at the side edges of the blank or longitudinally thereof are folded over and inward to overlie the side wall 52. It will be particularly noted that in this operation the overlying parts or the triangles 74 which appear at 76 in Figs. 3 and 8, are locked below the flaps 73. These locked-in parts have been shown dotted at 77 in Fig. 9. The first two folding operations should be performed in the order described; otherwise the triangles 74 will not be locked below the side flaps 73 as indicated by dotted lines at 77 in Fig. 9.

As shown in Fig. 4, the overturned flaps 73 are coated with adhesive throughout their extent. The adhesive is preferably placed on these overturned flaps after the bag blank has been separated from the web; and after the flaps 73 have been turned over. However, if desired, the adhesive may be applied to the flaps 73 prior to the separation of the bag blank from the web and before the flaps are turned over, that is, the under side of the advancing web.

The next step in the folding operation is shown in Fig. 5 and in perspective in Fig. 10. The position of the parts shown in Figs. 5 and 10 is accomplished by swinging the side wall 51 of Figs. 4 and 9 about the score line 41 so that the side wall 51 overlies the side wall 52. This operation brings the side edges of the side wall 51 in overlying relation with the inturned flaps 73 to which adhesive has been previously applied. By suitable means incorporated in the machine, the side edges of the side wall 51 are pressed firmly and in securing relation with the adhesive on the side flaps 73.

It will be apparent from an examination of Fig. 1 that successive blanks are oppositely folded, that is, in bag blank 44 side wall 51 is folded over side wall 52 while in bag blank 46, side wall 53 is folded over side wall 54.

It will now be particularly noted that the seams between the side walls 52 and 52 are inturned seams and such overlying layers as appear on the external part of the bag lie at the very side edges of the bag, as illustrated at 81 in Fig. 5. Thus the edge formed by the overlying layers is substantially concealed since it lies at the extremities of the side edges of the bag rather than being spaced inward therefrom where the seams would be more visible. This would occur if adhesive were applied to the upper surfaces of the side flaps 73 as they appear in Fig. 3 and the side wall 51 were folded over upon the side wall 52 prior to folding the side flaps 73 inward and downward on the outer sides of the side wall 51.

It will be particularly noted from an examination of the cut away parts in Fig. 5 that the bottom of the bag is formed by four layers of paper, two of which overlie each other and are continuous around the score line 41 and the other two of which overlie each other and are continuous around the score line 42. The score line 43 lies between the pairs of overlying layers and thus the side walls 51 and 52 are part of a continuous sheet of paper and the bottom of the bag contains no seam through which materials are likely to sift.

In Fig. 11 I have shown the next operation in perspective. In this view the bag has been turned around with the bag bottom lowermost on the sheet but with the same side wall 51 uppermost. The superimposed layers defined by the fold line 41 are then separated or spread apart from the superimposed layers defined by the fold line 42. When these layers are spread apart, pockets designated by the numeral 82 are formed at the corners of the bottom of the bag into which adhesive is sprayed by any suitable means such as nozzles 83.

The next folding operation is shown in Fig. 12 in which the triangular portions overlying the pockets 82 are pressed down and sealed by the adhesive in the pockets 82 so that the bag lies flat as illustrated in Fig. 12 with the fold line 43 overlying the fold line 48, the fold line 42 at the bottom of the bag and the fold line 41 overlying the side wall 51. In this position of the parts the bags may be stacked for shipment and they are intended to remain in this condition until they are to be used.

In Figs. 14 and 15 I have provided two perspective views, the parts being broken away in Fig. 15 to illustrate more clearly the construction of the bag bottom and the purpose of perforating the triangles 63, 64, 65 and 66.

Fig. 14 is an enlarged perspective view of the left hand corner of Fig. 11 and illustrates the surfaces over which adhesive is sprayed. These surfaces include the perforated triangles 64 and 65. When the parts are pressed down as shown in Fig. 12, the bottom of the bag, as viewed in Fig. 12, will appear as shown in Fig. 15. In Fig. 15 I have broken away parts of the bag which appear at the bottom when the bag is in the condition shown in Fig. 12. However, when the bag is opened up as shown in Fig. 13, the broken away parts of Fig. 15 lie at the sides of the bag adjacent the bottom. It will be appreciated that in Fig. 15 the perforated triangle 66 underlies the triangle 59 and the perforated triangle 63 underlies the triangle 56.

The purpose of the perforations in these triangles is to permit the adhesive sprayed in the pockets, as illustrated in Figs. 11 and 14 to flow through these perforations so as to lie between the upper surfaces of the perforated triangles 63 and 66 and the under surfaces of the triangles 56 and 59 so that these two surfaces can be secured together. If these two surfaces are not secured together, two semi-loose pieces will be free of the side walls of the bag on the inside thereof in which material may lodge. Such semi-loose pieces, for example, at the right bottom corner of the bag as shown in Fig. 15 would comprise the triangles 63 and 66 and the parts of the bag which lie below them. With the perforated triangles 63 and 66 secured to the triangles 56 and 59, semi-loose pieces on the inside of the bag are avoided. If desired, instead of perforating the triangles 63, 64, 65 and 66, adhesive may be applied to the upper sides of triangles 56, 57, 58 and 59 as they appear in Fig. 2. This may be done either prior or subsequent to severance of the bag blanks from the web.

In Fig. 15 I have also illustrated how the triangles 74 are locked in position and the purpose of performing the first folding operation shown in Fig. 2 prior to turning the side flaps inward as shown in Fig. 3. In Fig. 15 the side flap 73 has been indicated in dotted lines and the edge of the side flap 73 has been indicated by the dotted line 69. This portion of the side flap 73 is secured adhesively to the under side of the triangle 56 by the adhesive applied to the side flap 73 which will be apparent from an examination of Fig. 4. The under side of this side flap 73 receives some adhesive through the perforations in the triangle 63. The larger part of the triangle 74, that is, the part 75 as shown in Fig. 1 also receives adhesive through the perforations in the triangle 63 and overlies the part 75' of the triangle 74. Thus the corners of the bag are sealed; the corners are reenforced by overlying layers of paper; the corners of the bag are locked in and any possibility of material sifting through the corners of the bag is prevented.

In Fig. 13 I have illustrated the bag in open position to receive materials. In this position the bottom of the bag is squared so that the bottom of the bag will lie flatwise on the surface upon which it rests and the side walls of the bag will extend upward therefrom. It will be particularly noted from Fig. 13 that the flaps 31 which are turned inward to lock the handles in position extend continuously around the mouth of the bag except for the overlapping parts illustrated at 83. In addition to the flap 31 which overlies the side wall 51 of the bag and the flap 31 which overlies the side wall 52 of the bag, the flaps 31 include rectangular corners 86 (Fig. 2) which are folded over and secured to adhesive 87. Then when the side flaps 73 are folded over as illustrated in Fig. 4 and adhesive applied thereto, three thicknesses of paper exist at the corners 88 (Fig. 4), the upper one of which is loose. When the side wall 51 is folded down on the side wall 52, the corners of flaps 88 are secured to the corners 89 (Fig. 4). Thus the reenforcing band or flap 31 is in effect a continuous strip around the mouth of the bag which not only securely holds the handles in position but also reenforces the bag mouth against tearing. Moreover, the entire lip of the bag presents a folded non-cutting edge instead of a single cutting thickness of paper or two superimposed cutting thicknesses which would result if it were necessary to employ a patch to anchor the handles.

In Figs. 16 to 23 inclusive, I have shown a bag of the so-called automatic type, that is, one having a satchel or bellows fold at the sides. In these views parts corresponding to the parts of the embodiment shown in Figs. 1 to 15 inclusive have been correspondingly numbered. It is believed that from the description of Figs. 1 to 15 inclusive, it will be apparent how the web is scored, the handles applied and locked in position and the bag blank folded. The only difference in the scoring operations is that as the web advances two downwardly scored lines 91 are formed which extend transversely of the web and are spaced inward from the score lines 67. These score lines form the corners of the bag when it is erected for use as shown in Fig. 23.

When the parts of the bag have been folded so that the parts are in the position shown in Fig. 21 which corresponds to the condition of the bag shown in Fig. 12 in the first embodiment of my invention, the corners 92 are turned inward so that the edges of the bag as they appear in Fig. 21 lie between the transverse fold lines 91. The bag may then be folded flatwise as shown in Fig. 22 and occupies a minimum of space for storage and shipment. When the bag is to be opened for use the mouth is grasped and the bag is shaken to open it as shown in Fig. 23.

While I have shown the preferred forms of the bag of my invention and have described the preferred method of making it, it will be understood that the bag and its method of manufacture are susceptible of modification within the spirit of my invention as set forth in the appended claims.

I claim:

1. A bag structure comprising, in combination, a pair of side walls which face each other, a bag bottom integral with the side walls, a pair of side flaps integral with the side walls and adhesively securing the side walls together along their side edges, said bag having a mouth defined by inwardly turned mouth flaps integral with the side walls, said side flaps having the ends thereof adjacent the mouth of the bag overlying portions of the mouth flaps internally of the bag so that the lip of the mouth of the bag is a fold line which is continuous around the mouth of the bag except at the overlying portions to avoid a cutting edge at the lip and provide a reenforcing strip integral with the side walls.

2. A bag structure in accordance with claim 1 in which the mouth flaps overlie and anchor parts of handles for the bag.

3. A bag structure comprising, in combination, a pair of separate side walls which face each other and are integral at their bottoms, one of said side walls having flaps secured to the side margins of the other side wall, a bag bottom defined by three transverse parallel fold lines and diagonal fold lines to form a diamond folded bottom, said flaps having extensions which extend at the bottom of the bag at the corners and are infolded to overlie the bottom and lock the corners of the bottom and of the bag.

4. A bag structure in accordance with claim 3 in which the flaps are turned inwardly to overlie the side wall to which they are attached and the other side wall is adhesively secured to said flaps to the end that the seams lie at the side edges of the bag.

5. A method of making bags which comprises continuously moving a web of paper through a path of travel, forming a bottom for the bag and two side walls integral with the bottom by three score lines adjacent the center of the web parallel to each other and parallel to the path of travel of the web, forming score lines transversely of the web to define the side edges of one side wall of the bag and flaps contiguous to said side edges, forming score lines which extend diagonally from said parallel score lines to the side edges of the bag, and cutting the web along two transverse spaced lines which extend the width of the web and define a bag blank, each of said lines defining the flaps on the side edges of the same wall, the bag bottom and the side edges of the other side wall.

6. A method in accordance with claim 5 in which handles are attached to the side edges of the web as the web is advanced and prior to cutting bag blanks from the web.

7. A method of making bags which comprises continuously moving a web of paper through a path of travel, forming a bottom for the bag and two side walls integral with the bottom by three score lines adjacent the center of the web parallel to each other and parallel to the path of travel of the web, forming score lines transversely of the web to define the side edges of one side wall of the bag and flaps contiguous to said side edges, forming score lines which extend diagonally from said parallel score lines to the side edges of the bag, and cutting the web along two transverse spaced lines which extend the width of the web and define a bag blank, each of said lines defining the flaps on the side edges of the same wall, the bag bottom and the side edges of the other side wall, the lines of cutting defining the bag bottom extending diagonally whereby two complementary but oppositely disposed bags may be cut successively from the web.

8. A method in accordance with claim 7 in which a fold line is formed along the side edges of the web and handles are attached to the web at intervals spaced in accordance with the width of the bag blanks.

9. A bag having an open top and comprised of a single sheet of material which defines two side walls which face upon each other and extend downward toward the bottom of the bag, said bottom of the bag being part of said single sheet whereby the side walls and bottom are an integral unit, said bottom of the bag having at least three transverse score lines defining the bottom of the bag and angularly extending fold lines intersecting said transverse score lines whereby the bottom of the bag may be diamond folded, said bag having score lines at the longitudinal side edges thereof to define side flaps, said longitudinal score lines extending at the side edges of one side wall of the bag and across two of said transverse score lines and terminating at the third transverse score line to define bottom flaps.

10. A bag which when scored as defined in claim 9 has the side flaps adhesively secured to the inner face of the opposed side wall.

11. A bag which when scored as defined in claim 9 has the side flaps adhesively secured to the inner face of the opposed side wall and said bottom flaps lying between parts of said side flaps and the bottom of the bag to form a siftproof joint.

12. A method of making bags from a web of paper which comprises forming a central score line midway between the top and bottom edges of the bag and two score lines parallel thereto each equidistant therefrom and on opposite sides of said central score line, said three score lines defining a bag bottom and a bag side wall on each side of said bag bottom all integral with each other; forming score lines extending parallel to the side edges of the bag blank with said score lines extending along the two side edges of only one of the side walls and continuing across the bottom of the bag; cutting side edges which extend parallel to said latter score lines on the outside thereof to define flaps at the side edges of one of the side walls; cutting side edges defining the other side wall which are continuations of the side edge score lines in the other side wall; applying adhesive on one side of each of said flaps; then folding said bag blank as thus constituted on said central score line so that part of the bag blank bottom overlies the side wall which has flaps; then folding said blank so that said flaps overlie the side walls to which they are attached and part of the bag bottom and the adhesive sides of the flaps are brought uppermost, then folding said blank about said two non-central score lines so that the side walls overlie each other; and then adhesively securing said flaps to the side edges of the inner faces of the superimposed side wall.

13. A method of making bags in accordance with claim 12 in which the flap portions which are formed by continuing the score lines across the bottom of the bag are triangular and successive bag blanks are formed by continuously advancing, scoring and cutting the bag blanks with each two successive bag blanks being oppositely disposed with respect to said central score line and complementary whereby the formation of bag blanks completely consumes said web.

14. A bag structure having an open top and comprised of a single sheet which defines two side walls which face each other and extend downward from said open top toward the bottom of the bag, said bottom of the bag being part of said single sheet whereby the side walls and bottom are an integral unit, said bottom of the bag having means including transverse parallel fold lines and fold lines extending angularly from said parallel fold lines to the edges of the side walls enabling the bottom of the bag to be diamond folded with the bottom of the bag being free of seams through which the product carried in the bag may sift and the fibers of the bag extending transverse to the long direction of the sheet, one of said side walls having an integral flap along each side edge separated from the side wall by a fold line, said flaps being infolded to overlie their side wall and adhesively secured to the inside face of the other side wall and each of said flaps having a triangular extension contiguous to and separated from the bottom of the bag by a fold line, said triangular extensions being infolded over the bottom and locked in position by the side flaps when the folding and sealing of the bag is completed to avoid sifting at the corners of the bag.

15. A bag structure comprising, in combination, a pair of side walls of substantial area, a bottom defined by three parallel score lines integral with said side walls to form a seamless siftproof bottom, one of said side walls having flaps at its side edges which are infolded with respect to it so as to overlie the side wall to which they are attached, with the other side wall overlying and the inner side thereof secured to said flaps whereby seams are formed only at the sides of the bag in a position such that they are substantially invisible and a tight seal is formed, said side flaps having extensions which lie at the side edges of the portions of the bag which constitute the bottom, said extensions being folded transversely and secured to portions of the bottom of the bag to form locking joints at the corners of the bag.

16. A method of making bags which comprises the steps of continuously moving a web of bag making material through a path of travel; forming a bottom for the bag by score lines which extend longitudinally of the web while continuously moving said web and to define bag side walls which when folded will face each other and are integrally secured together by said bottom forming score lines; forming in said web transverse fold lines which define flaps to secure the side edges of the bag side walls together, and which transverse fold lines extend beyond the side walls as to which they are integral to form extensions; forming diagonal score lines in said material to provide a bag bottom structure which may be folded in the form of a diamond fold, cutting the bag blank thus formed from the web preparatory to forming a bag, enfolding said extensions with respect to the bottom and adhesively securing said extension in position to form locking joints at the corners of the bag.

References Cited in the file of this patent

UNITED STATES PATENTS

| | | |
|---|---|---|
| 159,029 | Grinter | Jan. 26, 1875 |
| 182,341 | Anderson | Sept. 19, 1876 |
| 227,147 | Campbell | May 4, 1880 |
| 837,324 | Mitchell | Dec. 4, 1906 |
| 1,238,411 | Leary | Aug. 28, 1917 |
| 1,302,885 | Vierengel | May 6, 1919 |
| 1,432,150 | Bertin | Oct. 17, 1922 |
| 1,511,043 | Sullivan | Oct. 7, 1924 |
| 1,671,050 | Snyder | May 22, 1928 |
| 1,694,455 | Taylor | Dec. 11, 1928 |
| 1,821,246 | Taylor | Sept. 1, 1931 |
| 1,880,277 | Pinkerton | Oct. 4, 1932 |
| 1,943,688 | Moore | Jan. 16, 1934 |
| 1,959,193 | Boeye | May 15, 1934 |
| 2,132,666 | Williams | Oct. 11, 1938 |
| 2,203,726 | Hellema | June 11, 1940 |
| 2,272,530 | Patterson | Feb. 10, 1942 |
| 2,290,564 | Krueger | July 21, 1942 |
| 2,469,536 | Winesett | May 10, 1949 |
| 2,529,976 | Strandberg | Nov. 14, 1950 |
| 2,603,407 | Crary | July 15, 1952 |

FOREIGN PATENTS

| | | |
|---|---|---|
| 651,326 | Great Britain | Mar. 14, 1951 |